ELECTROMAGNETIC DELAY LINE FOR A TRAVELLING WAVE TUBE

Filed Oct. 15, 1965 4 Sheets-Sheet 1

INVENTOR:
JEAN E. PICQUENDAR
BY: Stephen H. Frishauf
Atty

ELECTROMAGNETIC DELAY LINE FOR A TRAVELLING WAVE TUBE

United States Patent Office 3,505,616

Patented Apr. 7, 1970

3,505,616
ELECTROMAGNETIC DELAY LINE FOR A TRAVELLING WAVE TUBE

Jean E. Picquendar, Saint-Remy-les-Chevreuses, Olivier Cohen, Gif-sur-Yvette, Robert Lucien Metivier, Fontenay-aux-Roses, and Robert Thimonier, Clamart, France, assignors to Compagnie Francaise Thomson-Houston, Paris, France, a corporation Filed Oct. 15, 1965, Ser. No. 496,289
Int. Cl. H03h 7/30
U.S. Cl. 333—31 11 Claims

ABSTRACT OF THE DISCLOSURE

An electromagnetic delay line or slow-wave structure for a high power travelling wave tube which is insulatingly supported within a tubular metal housing. The line, which is comprised of ring-and-bar lines or lines derived thereof having nearly the same transmission and band width properties as a helical line, is supported by members of beryllium oxide secured to either group of said conductors, and located in the same plane as the conductor to which it is secured. The beryllium oxide support members, which are exposed only to weak electric fields, so as not to modify substantially the properties of the line, provide good electrical insulation while also transferring heat to the housing for cooling purposes.

The present invention relates to electromagnetic delay lines or slow-wave structures, and more particularly to delay lines of large band widths, for travelling wave tubes used as amplifiers or particle accelerators.

A delay line has the property of guiding an electromagnetic wave at a speed such that the phase velocity of the wave is less than the speed of light. Within the field of the guided wave along the line, an electron or ion beam is generated. When the speed of electrons or the ions is near the phase velocity of the wave, an exchange of energy occurs between the beam and the wave. Depending on the parameters of the apparatus, wave amplification and decrease in the speed of propagation of the beam is obtained; or, an attenuation of the wave and an increase in the particle speed can also be obtained. The first of these effects is utilized in travelling wave tube amplifiers, and the second in particle accelerators.

Delay lines tend to suffer from excessive heating, due to various causes. For example, electrons or ions are intercepted by structural elements of the tube and give up their energy in the form of heat. Such interception of electrons and ions is not desired, but can hardly be avoided in order to still have an efficient interaction between guided wave and electron or ion beam. If the ion or electron beam is close to the guided wave, focusing of the beam itself is rarely ever perfect. Further, in tubes of great power, this source of heat itself can be important because, due to the great speed of the electrons or ions in the beam, the difficulty of focusing is increased with increasing temperature. In addition, ohmic losses, dielectric or magnetic losses arising from the action of the electric wave propagating down the delay line, itself, arise; and further, attenuating means introduced into the delay line to eliminate oscillation also absorb power and thus generate heat. It is thus necessary to provide means for cooling the delay line.

Delay lines for which cooling does not present problems are known. These are the lines directly constructed on the basis of wave guides. Such a line may consist of a metallic tube, in which, in electrical contact with the walls of the tube, transverse conductors are uniformly arranged. These conductors may be in the form of diaphragms or transverse plates, through the axes of which the beam passes. If the wall of the tube at the same time forms the attenuating element and the outer cover of the delay line, it is clear that external cooling of this wall forms an efficient cooling of the entire assembly, and of all elements of the line which may heat up. For this reason, such a line is often used in high power work.

Unfortunately, the above-mentioned types of tubes have a comparatively narrow band width and have the action of a filter, due to their periodic structure.

Cooling of lines of large band width poses problems. There are lines, for example, in which there is no discontinuity, such as helical lines having a circular cross section, or lines having only slight discontinuities, such as intersecting helices or round lines. Such must not contain any elements which are in contact with a conductive wall, such as an external metal tube. Thus, cooling of such lines is much more difficult than cooling of lines of narrow band width. Helical lines may be cooled by liquid being passed through the interior of a hollow conductor; however, unless the conductor itself has substantial cross section, such cooling is still difficult because substantial pressure is necessary in order to force cooling liquid through the ordinarily narrow and restricted cross sectional area.

It has been proposed to enclose helical delay lines within a quartz tube. In order to obtain a good thermal contact, the helix is constructed with a rectangular cross section, and with an outer diameter which is so related to the interior diameter of the quartz tube that at the operating temperature the helix is forced against the wall of the quartz tube as a result of thermal expansion. This ensures a good mechanical contact between the helix and the quartz tube, thus enabling heat to be extracted from the helix. However, a very accurate construction is required to ensure that the pressure shall not be great enough to burst the tube, or too small to prevent good contact.

It has likewise been proposed to construct delay lines utilizing an external glass container. However, in such structures, the glass must likewise be in good contact with the helix, and as a cooling surface, glass with its low thermal conductivity is a poor substance, further subject to softening and deformation upon heating to operating tempearture.

It is an object of the present invention to provide a delay line suitable for high power use, having a large band width, or band pass capability, of substantial mechanical strength and providing for efficient cooling of the elements contained in the line.

Briefly, in accordance with the present invention, connection and support members consisting essentially of beryllium oxide are provided in good mechanical contact with both metallic members forming the delay line, and a metallic tube forming the outer wall; the structure is so arranged that the beryllium oxide members are located in the same plane as the conductor elements of the delay line to which it is attached and further, that it extends radially with respect to the longitudinal axis of the tube forming the delay line. This structure provides for location of the beryllium oxide within the tube at places of low power and low field, thus minimizing losses.

Beryllium oxide has the property of being a good thermal conductor, that is, having approximately half of the capacity of thermal conduction as copper, up to temperatures of about 1500° C., a softening point of about 2500° C., and substantial mechanical strength. Beryllium oxide has already been used in order to provide support members capable of conducting heat. Such use has been generally in connection with metal anodes. Here, the problem is simple because the electrical field itself is without importance. This is not so in delay lines. The dielectric constant of beryllium oxide is high—approximately 8— and presence of beryllium oxide within the electric field in the interior or at the exterior of a delay line decreases its electrical impedance characteristics, which has as a result not only a reduction in the propagation speed of the wave, but also a substantial decrease in efficiency of the interaction of the wave and the electron beam, due to decrease of coupling resistance. A further and much more serious difficulty is that uncontrolled impedance variations along the line may arise and that, if thermal contact of a helical delay line with a beryllium oxide tube instead of with a quartz tube is desired, such uncontrolled variations may cause hot spots, and locally varying dielectric constants. This makes the tubes themselves unique, that is not capable of being exchanged for tubes of similar types, and not subject to mass or series production guaranteeing reproducibility of performance. In addition, beryllium oxide is a material which is difficult to work. It is very hard and at present the pieces thereof are obtained by sintering. Unfortunately, it is impossible to obtain pieces by this process having high precision and assuring reproducibility. Thus, due to these difficulties, use of beryllium oxide tubes in helical delay line structure has not gained favor, and such tubes, as the tubes within quartz, are not reliable. Any imperfection in the manufacture of such tubes is furthermore dangerous due to the high dielectric constants of beryllium oxide, which, as has been mentioned, is 8, rather than the 4.7 for the quartz.

For the above reasons, beryllium oxide has not been used with delay lines of large band width, such as helical or crossed helical delay lines, because of the difficulty with obtaining reproducible tubes and the expense in manufacturing the same.

The present invention provides for a delay line utilizing beryllium oxide as heat conductors and has the ability to form a good thermal contact between the metal elements of the delay line and the beryllium oxide in a reproducible and easily manufactured manner; and further, to provide for placement of the beryllium oxide elements in such a manner that they are not within any intense electric field, such as for example between adjacent elements of the delay line.

The structure, organization, and operation of the invention will now be described more specifically in the following detailed description with reference to the accompanying drawings, in which.

Figure 1:
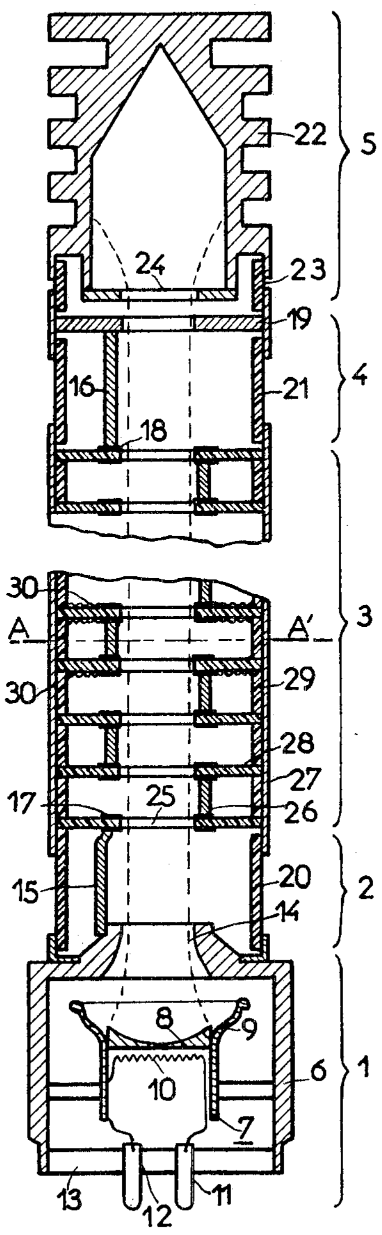
FIG. 1 is a longitudinal section of travelling wave tube with a delay line according to the invention, omitting, or schematically showing non-essential elements.

FIG. 1 illustrates a travelling wave amplifier tube having the following general sections: a cathode region 1, an input coupling region 2, delay line region 3, output coupling region 4, and anode or collector region 5. Cathode region 1 is formed by an outer housing 6, generally consisting of ferromagnetic material. A cathode structure 7 containing a concave emitting cathode 8 and a focusing electrode 9 is located therein. The heater wire 10, connected to terminals 11, 12 and brought out through a socket seal 13 is connected as well known in the art. When heated, cathode 8 emits a beam of electrons, the outer limit of which is indicated by the dashed lines 14. Focusing of this beam of electrons is accomplished as well known in the art by applying potential between housing 6 and cathode 8, or by additional focusing electrodes, not shown, as is known in the art. The ferromagnetic housing 6 separates the cathode from the field within the delay line, and from such magnetic fields as may be utilized to focus the electron beam. Regions 2 and 4 contain coupling conductors 15 and 16, connected to the terminal portions of the delay line elements at 17, 18. An apertured diaphragm 19 separates output coupling region 4 from the anode region 5. Housings 20, 21, which enclose the coupling regions 2, 4, consist of insulating material, for example ceramic.

The anode, or electron collector, is formed by a hollow metal body 22, preferably finned at the outside, as shown, in order to improve cooling. It is connected by means of an insulating, for example ceramic, sleeve 23 to the remainder of the tube, in order to be connected to a different potential than that of the delay line. Preferably, means are provided so that the magnetic field spreads out the beams of electrons in order to decrease localized heating, as shown schematically by the dashed lines 14. Such means do not form part of the invention and are well-known in the art and thus not illustrated.

Figure 2:
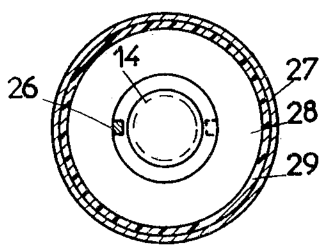
FIG. 2 is a transverse sectional view taken along line A–A′ of FIG. 1.

FIGS. 1 and 2 further show a series of metallic rings 25, and metallic bands 26. Metallic rings and bands 25, 26 form the delay line element itself. A metal envelope 27 encloses this delay line. Annular discs 28 consisting of beryllium oxide at the same time support the conductors 25, 26 and also serve as heat conductors. Between discs 28, spacer elements such as sleeves 29 are placed. These sleeves may, for example, be of alumina ceramic. Rings 25 are formed by thin copper sheets, folded around the edges of the central openings of the beryllium oxide discs 28, and soldered or welded thereon by known processes. The copper sheets are thin, for example .1 mm. thick, so that expansion due to the heat of soldering or welding or during operation of the tube, does not place appreciable stress on the connection with the beryllium oxide. The annular discs 28 are soldered or welded, in turn, at their external edge to the internal surface of the metal envelope 27. The metallic connecting ribbons 26 are alternatively placed at diametrically opposite points with respect to the axes of the tube. The ceramic spacer sleeves 29 maintain the spacing of the entire assembly and facilitate construction of the tube; their heat resistivity permits soldering of the rings 25 to the annular discs 28, and discs 28 to the outer envelope 27, as well as connection of rings 25 to ribbons 26 in a single step. Some of the annular beryllium oxide discs may be coated with resistive material 30, for example, thin layers of nickel, in order to have attenuating properties to prevent self-oscillation of the tube.

Figure 3:
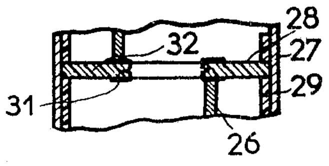
FIG. 3 is a partial longitudinal sectional view illustrating a modification of the structure of FIG. 1.

FIG. 3 illustrates a detailed view of a different embodiment to effect thermal and mechanical contact between the rings 25 and the beryllium oxide discs 28, in which the contact is maintained not only by soldering but also mechanically. The internal surface of the central opening within the disc 28 contains a groove 31, and the ring material is pressed into the groove, for example by swaging or rolling. The thus modified rings are illustrated at 32.

Figure 4:
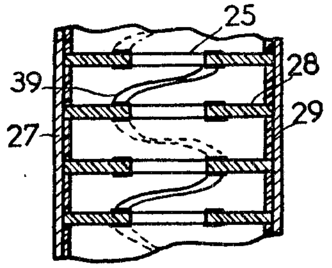
FIG. 4 is another modification of the structure of the FIG. 1.

FIG. 4 shows a variation in connection between rings, in which the axially spaced rings 25 are connected by bands 39, arranged as portions of the helix. The dashed lines indicated those portions not shown due to the sectional view. This structure provides for a wave propagation of lesser speed than the structure of FIG. 1, all other parameters remaining the same. Like parts are shown by like reference numerals.

Figure 5:
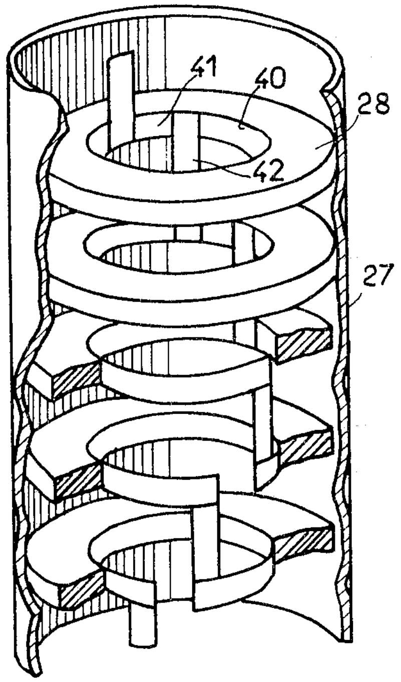
FIG. 5 is a perspective view, partly in section, illustrating a modification of the structure according to the invention.
Figure 6:
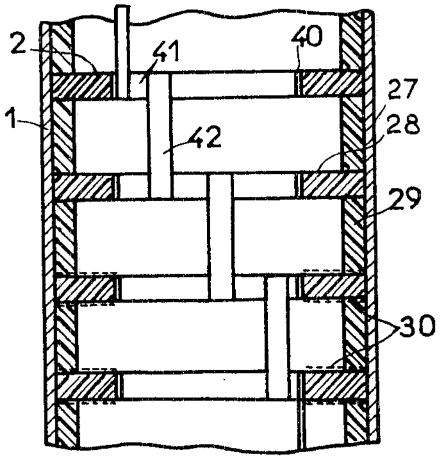
FIG. 6 is a longitudinal sectional view of the structure of FIG. 5.
Figure 7:
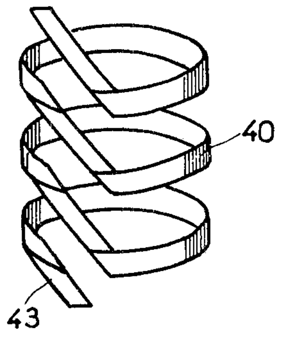
FIG. 7 is a perspective view of a modification of an element in the invention.

FIGS. 5 and 6 show a different form of the invention, in which the conductive rings 25 are replaced by conductors 40, which do not form a closed ring, but are formed with a gap 41. Furthermore, they are preferably formed by a metallic layer, such as copper, deposited on the inner surface of the beryllium oxide discs 28. Adjacent ones of the interrupted rings 40 are connected by conductive ribbons 42, parallel to the axis of the delay line and arranged in such a manner that the assembly of the interrupted rings 40 and ribbons 42 constitutes a conductor always wound around the axis in one direction only, so that, in general, the conductive area follows the form of a helix. The outer elements constituting the delay line of FIGS. 5 and 6 are essentially the same as those of the previous FIGURES, and are given the same reference numerals. FIG. 6 differs from the embodiment of FIG. 5 in that the spacer sleeves 29 are shown; further, resistive material 30 to form an attenuation element is illustrated in FIG. 6. FIG. 7 illustrates a variation useful in connection with the structure of FIGS. 5 or 6, in that the interrupted rings 40 are interconnected by ribbons 43 arranged inclined with respect to the axis of the tube as more closely approaching a helix.

Figure 8:
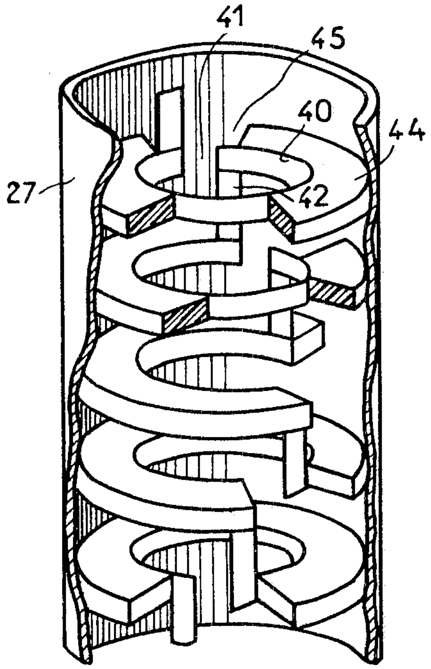
FIG. 8 is a view similar to FIG. 5 illustrating another modification.

FIG. 8 illustrates another form of the invention in which beryllium oxide discs 44 themselves are formed with gaps 45 in the region of interruption of the conductive strips. This form of the invention provides for considerable reduction of capacity between the outside of the rings and the inner conductive strips 40, thus reducing the periodic capacity along the line and improving its band width.

Figure 9:
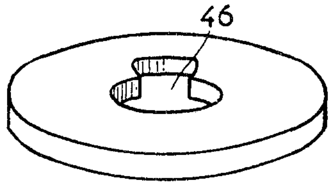
FIGS. 9 and 10 illustrate beryllium spacer elements.
Figure 10:
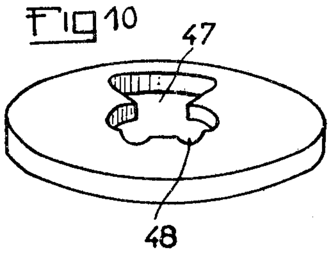

FIGS. 9 and 10 show other forms providing reduction of the capacity between the conductive region and the beryllium oxide disc. In FIG. 9, the disc has a recess 46 on its inner surface. In this case, gap 41 of the interrupted ring 40 cooperates with recess 46. FIG. 10 illustrates a disc in which the central opening is formed with a large recess 47 and two small notches 48 in order to further decrease the capacity without substantially decreasing the area of the themal contact and the mechanical strength. In this case, the gap 41 of the ring 40 cooperates with recess 47, while the body of the ring bridges the notches but does not adhere to the surface of the beryllium oxide disc at the location of these notches. The dimensions of notches 48 are chosen to be sufficiently small in order that the otherwise excellent heat dissipation characteristics of the line are not substantially affected.

Figure 11:
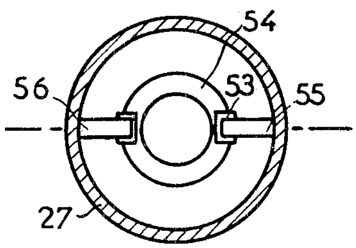
FIG. 11 is a cross sectional view of another modification of the structure according to the invention.
Figure 12:
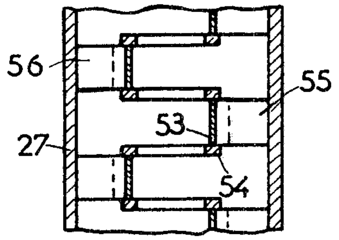
FIG. 12 is a longitudinal-sectional view along line B–B′ of FIG. 11.

FIGS. 11 and 12 illustrate a different form of the invention, in which the delay line section itself consists, similar to FIG. 1, of metal rings 54 interconnected by metallic bands 53. However, the beryllium oxide members are not connected to the rings, but to the axially extending bands. Thus, the beryllium oxide members are no longer in the shape of apertured discs, but of generally rectangular plates 55, 56 extending axially along bands and radilly from bands to the wall of envelope 27. The bands 53 are secured to the beryllium oxide members 55, 56 by soldering, as were the rings to the discs in the previous embodiment. The bands may be formed with a U-shaped cross section rather than being flat ribbons. Again, as in the previous embodiment, the interconnecting bands 53 are connected to the rings 54 at progressively diametrically opposite sides.

Figure 13:
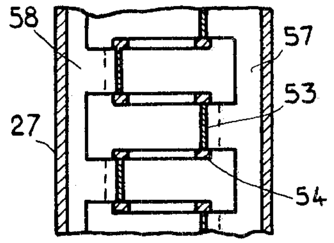
FIG. 13 is a modification of the structure according to FIGS. 11 and 12.

FIG. 13 illustrates a different embodiment which is easier to manufacture and has improved heat conductivity characteristics. A pair of axially extending plates 57, 58 of beryllium oxide is formed with indentations and projections; the projections are secured to the bands 53, and offset with respect to each other as seen in FIG. 13. The outer surface of the plates 57, 58 is sealed and secured to metallic wall 27. The depressions formed in the elements 57, 58 between the projections secured to the bands 53 should be sufficiently deep so that no dielectric material will be within regions of an intense electric field.

The invention thus relates to a delay line or slow-wave structure for a travelling wave tube with a metal housing which has an axis extending along a major dimension thereof. A group of annular conductors (FIG. 1: 17; FIG. 3: 31; FIGS. 5 through 8: 40; FIGS. 11 through 13: 54) are located along said axis, spaced from each other, each arranged in a plane transverse to said axis. A second group of conductors is provided to interconnect adjacent ones of said annular conductors, said second group being formed, for example, by axial bands (FIG. 1: 26; FIGS. 5, 6, 8: 42; FIGS. 11, 12, 13: 53) or by bands extending spirally around the axis (FIG. 4: 39; FIG. 7: 43). The tube is entirely surrounded by a metal housing, to dissipate heat. In order to secure the conductors of either group to the outer metal housing, or sleeve, members formed of beryllium oxide which has good insulating and still heat conducting properties are provided, secured to either group of said conductors and located in the same plane as the conductor to which it is secured. Thus, the beryllium oxide connection members may be in form of apertured discs (FIGS. 1 through 10) to which annular conductors are secured; or in the form of parallel strips or plates, interconnecting the metal sleeve and the conductors of the second group (FIGS. 11, 12, and 13). The beryllium oxide members are arranged within the metal housing in such a manner that they are not exposed to any intense electric fields. Thus, if the annular conductors are not in the form of closed ring but rather have a gap interrupting the circular form of the conductor (see FIGS. 5 through 8) it is preferred to likewise form a gap in the beryllium oxide spacer member, or at least a recess so that little of the spacer member material is present where an intense field exists (see FIGS. 9 and 10). Likewise, if the beryllium oxide connecting members are in the form of parallel plates, they may either individually secure only the connecting bands or ribbons to the outer housing (FIGS. 11, 12) or in the form of plates with projections and recesses therebetween, arranged staggered within the tube so that the recesses themselves are deep enough to remove any material from a region of intense electrical field.

Various structural changes and modifications, as determined by requirements of particular applications, may be made without departing from the inventive concept, and various combinations of features described separately and with respect to the drawings individually, may be made.

The dimensions of the various elements are determined by the design parameters of the delay line. The beryllium oxide members are best arranged such that they are always shielded or shadowed from an intense electric field by an electrical conductor. For axially extending conductors (FIGS. 11 through 13), the connection members, or their projecting portions, should be no longer than the conductors to which they are secured.

We claim:

1. In a delay line for a travelling wave tube which is insulatingly supported within a tubular housing, a first group of substantially annular conductors located within said housing, said conductors being mounted transverse to the longitudinal axis of said housing and spaced from each other along said axis; a second group of conductors interconnecting adjacent ones of said annular conductors; the improvement comprising: connection members consisting essentially of beryllium oxide located within, and in good thermal contact with, said housing in areas of weak electric fields and extending radially with respect to said axis for supporting at least one of said groups of conductors, said beryllium oxide connection members being located in the same plane as the conductor which it supports and having substantially no effect on the electrical characteristics of the delay line.

2. Delay line as claimed in claim 1 wherein said beryllium oxide members are formed as centrally apertured annular discs, each of said discs being placed in the plane of an annular conductor and having said annular conductor secured to the surface of said disc forming said central opening, the outer annular surface of said discs being secured to said housing.

3. Delay line as claimed in claim 1 including spacer members located between adjacent beryllium oxide connection members.

4. Delay line as claimed in claim 2 wherein the annular conductors of said first group are closed rings, and said conductors of said second group are axially extending bands interconnecting adjacent rings, alternate ones of said bands being located diametrically opposite from each other with respect to said axis.

5. Delay line as claimed in claim 2, wherein said annular conductors are formed of closed rings and said conductors of said second group interconnect a point on any one ring with a diametrically opposite located point on an adjacent ring, said bands being spiralled around said axis and clear of the region of said central aperture.

6. Delay line as claimed in claim 2, wherein said annular conductors are open rings having a gap within their circumference, and said conductors of said second group are bands interconnecting ends of one ring to an end of an adjacent ring, said ends of said rings being offset with respect to each other and spirally progressing along the axis of said line in the same sense.

7. Delay line as claimed in claim 6, wherein said beryllium oxide discs are formed with a recess in the region of said gap.

8. Delay line as claimed in claim 1, wherein said beryllium oxide connection members are radially extending plates secured to said housing on one side and secured to said conductors of said second group of conductors on the other.

9. Delay line as claimed in claim 1, wherein said connection members are formed of flat plates extending essentially the length of said line, and secured to said housing to project radially inwardly thereof; said plates being formed with projections opposite conductors of said second group, said conductors of said second group being secured to said projections.

10. Delay line as claimed in claim 8, wherein said connection members have an axial dimension which is equal to or less than the length of a conductor of said second group of conductors.

11. Delay line as claimed in claim 1, including high frequency energy absorbing material applied to at least one of said connection members.

References Cited

UNITED STATES PATENTS

| | | | |
|---|---|---|---|
| 2,992,348 | 7/1961 | Okstein | 313—84 |
| 2,888,596 | 5/1959 | Rudenberg | 315—3.5 |
| 2,967,968 | 1/1961 | Nalos | 315—3.5 |
| 3,099,767 | 7/1963 | Gross | 315—3.6 |
| 3,181,024 | 4/1965 | Sensiper | 315—3.5 |

HERMAN KARL SAALBACH, Primary Examiner

C. BARAFF, Assistant Examiner

U.S. Cl. X.R.

315—3.5, 3.6